United States Patent
Dakar et al.

(10) Patent No.: US 8,249,999 B2
(45) Date of Patent: Aug. 21, 2012

(54) SYSTEMS AND METHOD FOR COSTING OF SERVICE PROPOSALS

(75) Inventors: Bernard Dakar, Saint Laurent du Var (FR); Philippe Favre, Villeneuve Loubet (FR); Patrick Gayrard, cagnes sur Mer (FR); Emmanuel Lancon, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1709 days.

(21) Appl. No.: 10/985,320

(22) Filed: Nov. 10, 2004

(65) Prior Publication Data

US 2005/0108085 A1    May 19, 2005

(30) Foreign Application Priority Data

Nov. 14, 2003 (EP) .................................... 03368097

(51) Int. Cl.
*G06F 17/00* (2006.01)
*G06Q 10/00* (2006.01)
*G06Q 20/00* (2006.01)
(52) U.S. Cl. ........... 705/400; 705/1.1; 705/7.23; 705/80
(58) Field of Classification Search ................... 705/1.1, 705/7.23, 80, 400
See application file for complete search history.

(56) References Cited

U.S. PATENT DOCUMENTS

| | | | |
|---|---|---|---|
| 5,893,082 A * | 4/1999 | McCormick | 705/400 |
| 6,446,053 B1 * | 9/2002 | Elliott | 705/400 |
| 2001/0032172 A1 * | 10/2001 | Moulinet et al. | 705/37 |
| 2002/0026343 A1 * | 2/2002 | Duenke | 705/8 |
| 2002/0082882 A1 * | 6/2002 | Perry et al. | 705/7 |
| 2002/0087332 A1 * | 7/2002 | Como | 705/1 |
| 2002/0087485 A1 * | 7/2002 | Alberti et al. | 705/80 |
| 2008/0154631 A1 * | 6/2008 | Greenstein et al. | 705/1 |

FOREIGN PATENT DOCUMENTS

EP     1054333 A2 *   11/2000

* cited by examiner

*Primary Examiner* — Fadey Jabr
(74) *Attorney, Agent, or Firm* — Hoffman Warnick LLC; Andrea Bauer (57) ABSTRACT

Systems are provided for costing service proposals, each comprising a set of proposal elements (OEs) selected from a predetermined group of proposal elements. A proposal costing system has a proposal formulator for selecting a set of proposal elements (OEs) for a new service proposal from the predetermined group of proposal elements in response to user input. The system includes a cost controller for maintaining, for each OE, service data indicative of service tasks associated with that proposal element. The system is adapted for determining a total cost for a new service proposal in dependence on the service data for the selected proposal elements and cost data indicating a cost of service tasks indicated by the service data. In addition, the cost controller is adapted for automatically updating the service data for OEs in the group in dependence on maintenance data indicative of service tasks performed in operation of real services.

7 Claims, 4 Drawing Sheets

SYSTEMS AND METHOD FOR COSTING OF SERVICE PROPOSALS

TECHNICAL FIELD

This invention relates generally to the costing of proposals for the provision of services. Embodiments of the invention find particular application in the field of data processing outsourcing businesses, where customer systems such as data communications networks, software systems, computers and other data processing devices are maintained by a service provider on the customer's behalf.

BACKGROUND ART

Costing of service proposals, or offers for services, is fundamental to efficiency of an outsourcing business. In existing data processing outsourcing operations, each new service proposal is formulated as an aggregation of discrete proposal elements. Each proposal element represents a particular component of the overall service to be provided to the customer. When generating a new proposal for a customer, the desired proposal elements are selected, via an operator workstation for example, from a predetermined group of proposal elements stored in the proposal costing system. The entire range of services available to customers can be represented by this predefined group of proposal elements, and individual service proposals can be tailored to customers' needs by selecting appropriate sets of proposal elements from the group.

For each proposal element in the above system, the proposal costing system stores service data indicative of one or more service tasks associated with that proposal element. For example, a given proposal element may represent a specific category or type of service, such as "monitoring a type-X server for 12 months, 24 hours a day," or "managing a type-Y router for 12 months, 24 hours a day." The service data for the proposal element then indicates the individual task(s) involved in provisioning of this particular type of service. For example, for the proposal element "managing a type-Y router . . . ," the tasks indicated by the service data might be:
- 10 changes of category "low" (corresponding to less than 15 minutes intervention, low skill);
- 5 changes of category "medium" (corresponding to less than 30 minutes intervention, medium skill); and
- 2 changes of category "high" (corresponding to less than 60 minutes intervention, high skill). Here, therefore, the service tasks correspond to changes of three different time/complexity categories, with a number of instances specified for each task according to the number of times performance of that task is expected to be required in operation of the service. Whatever the particular tasks, the function of the service data is to provide a convenient basis for costing proposal elements in terms of elementary tasks to which a cost can be attributed. The cost of individual tasks can be based on the execution effort (labour time, complexity, skill level, etc.) and/or any fixed costs associated with a task (fixed service charges, item costs, etc.). Using cost data indicative of such task costs, the proposal costing system can determine the cost of individual proposal elements selected for a new service proposal, and consequently obtain a total cost for the complete proposal.

At present in such proposal costing systems, the service data used for costing proposal elements is determined heuristically, relying primarily on estimation by a system operator based on past experience of the tasks involved, and may be updated from time to time at the operator's discretion based on documents and information collected via a data collection process based on interviews, workshops, etc. The accuracy of the proposal costing system is thus heavily dependent on the accuracy of estimates made by the operator or operators responsible for setting up and monitoring the system.

Existing maintenance data has been used in some fields for certain types of cost analysis. For example: http://asd-www.larc.nasa.gov/barkstrom/private/ECS_Maintenance_Cost_Model/Index_to_Cost_of_Maintenance.htm describes use of a software tool which uses inputs from various sources, including data read from an existing database, to provide an estimate of the maintenance costs for a particular system; http://reliability.sandia.gov/Maintenance/Maintenance_Cost/maintenance_cost.html discloses a software tool for deriving a maintenance cost breakdown for machinery from maintenance records; http://www.colesherman.com/whatwedo/systems/tmcm.htm discloses a system which uses accumulated maintenance data from railway track maintenance companies to derive relationships between track maintenance price and track age. These are then used to predict future maintenance prices for contract negotiation purposes. While these systems use existing databases for various maintenance cost analysis purposes, none discloses automatic updating of service data in a proposal costing system as described above in dependence on maintenance data indicative of service tasks performed in operation of real services.

SUMMARY OF THE INVENTION

The present invention is predicated on the realisation that maintenance logs, recording details of service tasks performed for customers in operation of real services, provide an ideal source of information for proposal-costing purposes, and that, by providing proposal costing systems with access to maintenance databases, service data used for costing proposals can be updated automatically based on real-life data.

The present invention provides a system for costing service proposals, each comprising a set of proposal elements selected from a predetermined group of proposal elements. The system comprises: a proposal formulator for selecting a set of proposal elements for a new service proposal from the predetermined group of proposal elements in response to user input; and a cost controller for maintaining, for each proposal element, service data indicative of service tasks associated with that proposal element; wherein the system is adapted for determining a total cost for a new service proposal in dependence on the service data for the selected proposal elements and cost data indicating a cost of service tasks indicated by the service data; and wherein the cost controller is adapted for automatically updating the service data for proposal elements in the group in dependence on maintenance data indicative of service tasks performed in operation of real services.

In embodiments of the present invention, therefore, the service data defining the fundamental tasks on which proposal costs are based is automatically updated by the cost controller based on maintenance data which indicates actual service tasks performed in operation of real services. The use of real-life data provides for far greater accuracy in proposal costing, eliminating the possibility of errors inherent in systems which rely on operator estimates. Moreover, the automatic update process allows service data to be adjusted without operator intervention, allowing continuous production of reliable, up-to-date proposal estimates.

As explained earlier, the predetermined group of proposal elements represents the range of services on offer to customers. This group may of course be modified from time to time in line with changes to the service range, and operation of the proposal costing system will then continue with the modified group of proposal elements.

In general, the set of proposal elements selected for a new service proposal may comprise one or more proposal elements, and one or more service tasks may be indicated by the service data for a given proposal element.

The cost of service tasks may be indicated directly or indirectly by the cost data. For example, the cost data might define specific total costs for specified tasks or task-types. Alternatively, or in addition, the cost data might define hourly rates for labour (which may be categorised by complexity, skill level, etc., as appropriate), whereby task-costs can be determined from the hourly rates in conjunction with data indicating the labour time (again categorised as appropriate) attributed to specific tasks. This latter data might form part of the service data in some embodiments, or part of the cost data in others. In any case, it suffices that a total cost can be determined for a new service proposal in dependence (whether wholly or partly) on the cost data and the service data for the selected proposal elements. Clearly the total proposal cost will depend on the cumulative cost for the totality of tasks associated with the selected proposal elements. This total cost can be determined in a number of steps, and implementation of these steps can be shared in various ways between the proposal formulator and cost controller in different embodiments. Particular examples will be described in detail below.

The present invention also provides a method for costing service proposals, the method comprising: selecting a set of proposal elements for a new service proposal from a predetermined group of proposal elements in response to user input; maintaining, for each proposal element, service data indicative of service tasks associated with that proposal element; determining a total cost for a new service proposal in dependence on the service data for the selected proposal elements and cost data indicating a cost of service tasks indicated by the service data; and automatically updating the service data for proposal elements in the group in dependence on maintenance data indicative of service tasks performed in operation of real services. In general, where features are described herein with reference to apparatus embodying the invention, corresponding features may be provided in a method embodying the invention, and vice versa.

Methods embodying the invention may be implemented by a suitably programmed data processing system. Thus, the invention also provides computer program code means adapted to perform a method as hereinbefore described.

The invention further provides a cost controller for a service proposal costing system in which service proposals are formulated by selecting respective sets of proposal elements from a predetermined group of proposal elements. The cost controller comprises data processing means adapted for: maintaining, for each proposal element, service data indicative of service tasks associated with that proposal element; automatically updating the service data for proposal elements in dependence on maintenance data indicative of service tasks performed in operation of real services; and in response to a proposal element request for a proposal element, supplying proposal element data, dependent on the service data for that proposal element, to the system for use in costing a service proposal for which that proposal element is selected.

A data processing device may be configured by software to implement a cost controller as herinbefore described. Thus, the invention also extends to a computer program for use in a service proposal costing system in which service proposals are formulated by selecting respective sets of proposal elements from a predetermined group of proposal elements, and in which, for each proposal element, service data indicative of service tasks associated with that proposal element is stored in the system. The computer program comprises code means adapted to: automatically update the service data for proposal elements in the group in dependence on maintenance data indicative of service tasks performed in operation of real services; and, in response to a proposal element request for a proposal element, to supply proposal element data, dependent on the service data for that proposal element, to the system for use in costing a service proposal for which that proposal element is selected.

BRIEF DESCRIPTION OF DRAWINGS

Embodiments of the invention will now be described, by way of example, with reference to the accompanying drawings in which.

DETAILED DESCRIPTION OF THE INVENTION

Figure 1:
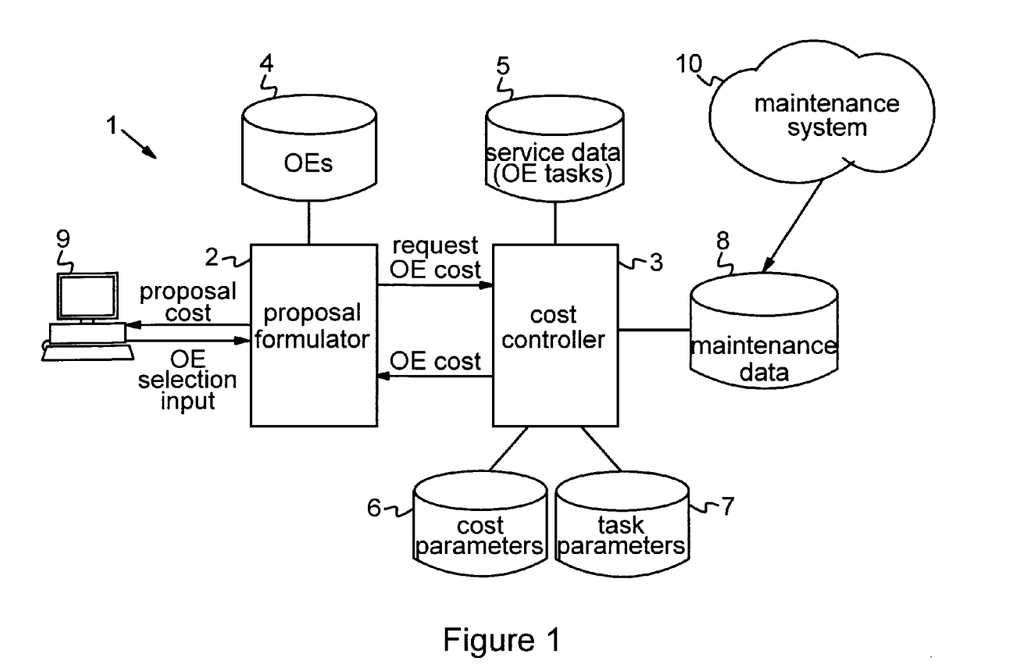
FIG. 1 is a schematic block diagram of a first proposal costing system embodying the invention.

The block diagram of FIG. 1 shows a first embodiment of a proposal costing system for a data processing outsourcing business. The proposal costing system, indicated generally at 1, comprises a proposal formulator 2, a cost controller 3, and five databases indicated at 4 to 8 in the figure. Database 4 stores a predetermined group of proposal elements, or offer elements, "OEs" which collectively represent the range of outsourcing services on offer to customers. This OE database is accessible by the proposal formulator 2. The proposal formulator 2 is also connected to an input/output device, here an operator workstation 9, whereby an operator can interact with the system to generate service proposals as described further below. The remaining four databases are accessible to the cost controller 3 in this embodiment, and the data stored in these databases will now be described in turn.

The database 5 contains service data which is maintained by cost controller 3 in operation of the system. This service data indicates the fundamental service tasks associated with each of the proposal elements (OEs) stored in OE database 4. These service tasks are the basic tasks which are expected to be required for a given OE in operation of the service, and provide the basis for attributing a cost to individual proposal elements as discussed further below. For each OE, the service data indicates one or more service tasks as appropriate for that OE. In this embodiment, where a given task may be performed more than once in operation of the service, the service data indicates an expected number of instances for that task corresponding to the number of times performance of that task is expected to be required. Clearly the precise form of the service data is not critical to operation of the system. By way of example, however, a proposal element corresponding to managing a type-Y router for 12 months, 24 hours a day, might be represented by the following service data in this embodiment:

```
<OE category="Type-Y router 12m">
    <task type="change" complexity="low">
        <number>10</number>
    </task>
    <task type="change" complexity="medium">
        <number>5</number>
    </task>
    <task type="change" complexity="high">
        <number>2</number>
    </task>
    <task type="problem" severity="low">
        <number>5</number>
    </task>
    <task type="problem" severity="medium">
        <number>3</number>
    </task>
    <task type="problem" severity="high">
        <number>1</number>
    </task>
</OE>
```

Here, therefore, the proposal element to which the service data corresponds is represented by the OE category "Type-Y router 12*m*." Six service tasks are then defined. The first three service tasks correspond to changes of complexity categories "low," "medium," and "high" respectively. These change categories represent particular time/skill categories for costing purposes as discussed below. The last three service tasks correspond to dealing with problems of severity categories "low," "medium," and "high" respectively, where again these severity categories represent particular time/skill categories for costing purposes. An associated number of instances is then specified for each of these tasks. (While the numbers of instances are expressly indicated in the above example, in general these numbers may be indicated directly or indirectly. For example, a given task could be listed a number of times according to the expected number of instances for that task. In addition, where a specified service task represents a "one-off" task, which will only ever be performed once, then a number of instances need not necessarily be specified in the service data). In this example, tasks correspond to either changes or problems, where changes might be routine or standard tasks and problems might be tasks of a less predictable nature which must be dealt with as and when they arise.

Databases 6 and 7 contain the cost data which is used by system controller 3 for calculating task and proposal element costs in this embodiment. Specifically, database 7 in this example stores task parameters which specify the expected labour times for particular service tasks, or types of tasks, defined in the service data. In this example, it is assumed that tasks of complexity/severity categories "low," "medium," and "high" in the service data correspond to respective time/skill ratings, e.g: "low"=up to 15 minutes intervention, low skill; "medium"=up to 30 minutes intervention, medium skill; and "high"=up to 60 minutes intervention, high skill. Thus the task parameters in database 7 specify the appropriate labour times for each task, where in general these labour times may be specified for individual OEs, for subsets of OEs with identical task time/skill ratings, or for all OEs where task time/skill ratings are standardised throughout. Database 6 then stores cost parameters which specify labour costs, in this case the hourly charge for particular skill levels, and any fixed costs such as fixed service charges, replacement item costs etc., associated with specific service tasks. (Note that, while the cost and task parameters could be combined to provide a specified cost-per-task according to time/skill rating, defining these parameters separately is preferred for ease of updating the cost data when costs such as labour rates are changed from time to time in operation).

Database 8 stores maintenance data, i.e., real-life operation data, which is indicative of service tasks performed in operation of real services provided by the outsourcing business. This database contains the maintenance records for customer services, and the data is gathered and stored in this database in the usual way via the operation reporting system (referred to herein as the "maintenance system"), indicated schematically at 10, of the business. For example, a record will typically be set up for each new service on commencement of the customer contract, e.g., via an operator workstation of the maintenance system. Each time a service task is performed as part of that service, an entry for that service task will be added to the record, e.g., based on input by the maintenance engineer via an operator workstation. For each such entry, the data stored in database 8 indicates the particular OE and service task (as defined in service database 5) to which the task performed corresponds so that the appropriate OE service task represented by that entry can be identified subsequently by the cost controller. Any convenient id data can be used here. For example the OE category and change/problem category, as specified in the service data, which correspond to the task performed may be recorded in the maintenance entry, though some other form of id code by which the cost controller can identify the OE service task may be used if desired. Whatever id codes are employed, the appropriate codes can be entered by maintenance engineers as part of the service report process, or may be added automatically by the maintenance system in response to engineer input. For example, engineers may complete software forms provided by the maintenance system to collect the data required for maintenance entries (e.g., customer contract number, task(s) performed, date, labour time, etc., as appropriate), the maintenance system then generating and storing the maintenance entries in maintenance database 8.

The foregoing gives a basic description of the components of the proposal costing system 1, and the operation of the system will be described below with reference to FIGS. 2 to 3*b*. It will be understood from this description that the proposal costing system can be implemented by a suitably programmed data processing system, wherein one or more data processing devices are configured by computer programs to perform the functions described. For example, the proposal formulator may be implemented by a service proposal program running on a computer, whether an operator workstation 9 or a server accessible to a set of operator workstations. Similarly, for example, the cost controller may be implemented by a cost model program running on a computer, whether an individual workstation or (more usually) a server, where that server may or may not also implement the proposal formulator of the system. In general, a computer program for implementing one or both of the proposal formulator and cost controller may comprise a set of component programs for running on one or more data processing devices. Moreover, the program code means constituting such a computer program may be supplied embodied in a computer-readable medium, such as a diskette for loading in a data processing system. In the present embodiment, it is assumed that the proposal formulator is implemented by a local server which is accessible to a plurality of operator workstations 9, and which can communicate with a separate, centralised server implementing the cost controller 10. Whatever the particular arrangement of the system, suitable software for performing the various functions of the proposal formulator and cost controller will be apparent to those skilled in the art from the description herein. Also, in general databases 4 to 8 may be provided in storage which is local to, or remote from, the proposal formulator or cost controller as appropriate. While these databases are illustrated as separate components in FIG. 1 for clarity, in general these databases may be provided in one or more storage mechanisms, and the data structures constituting more than one database may be combined if desired.

In operation of proposal costing system 1, a new service proposal is generated for a customer by user input at workstation 9. In particular, workstation 9 provides an interface to proposal formulator 2 whereby a new proposal can be generated by selecting a set of proposal elements according to the customer's needs. The operation of proposal formulator 2 during this process is represented by the flow chart of FIG. 2. On commencement of the proposal generation process as indicated by step 15 in FIG. 2, the proposal formulator 2 awaits user input indicating a first component of the proposed service. In response to this user input from workstation 9, in step 16 the proposal formulator selects the OE stored in database 4 corresponding to the appropriate service component. In step 17 the proposal formulator then transmits a cost request for the selected OE to cost controller 3. The cost controller 3 operates as described below to determine the cost associated with that OE, and returns the OE cost to proposal formulator 2. The OE cost is stored by proposal formulator 2 in step 18, and in step 19 the proposal formulator determines if more OEs are still to be costed. If so (as indicated for example by the absence of a "proposal complete" input from workstation 9), then operation reverts ("Yes" at step 19) to step 16, and continues as described above for the next OE selection input from workstation 9. When all OEs have been selected and costed, e.g., when a "proposal complete" input has been received from workstation 9, operation proceeds from step 19 ("No") to step 20. Here, proposal formulator 2 calculates the total proposal cost as the sum of the individual OE costs stored at step 18 (plus any standard service costs if appropriate). In step 21 the proposal formulator then outputs the total proposal cost to workstation 9 for display to the operator. (Note that, while the basic steps in operation of the proposal formulator 2 are indicated in FIG. 2, the particular order of these steps need not be exactly as represented. For example, OE costs may be stored whenever these are received from cost controller 3, and the proposal formulator need not necessarily await receipt of a given OE cost before proceeding with the next OE selection and cost request steps).

Figures 3A, 3B:
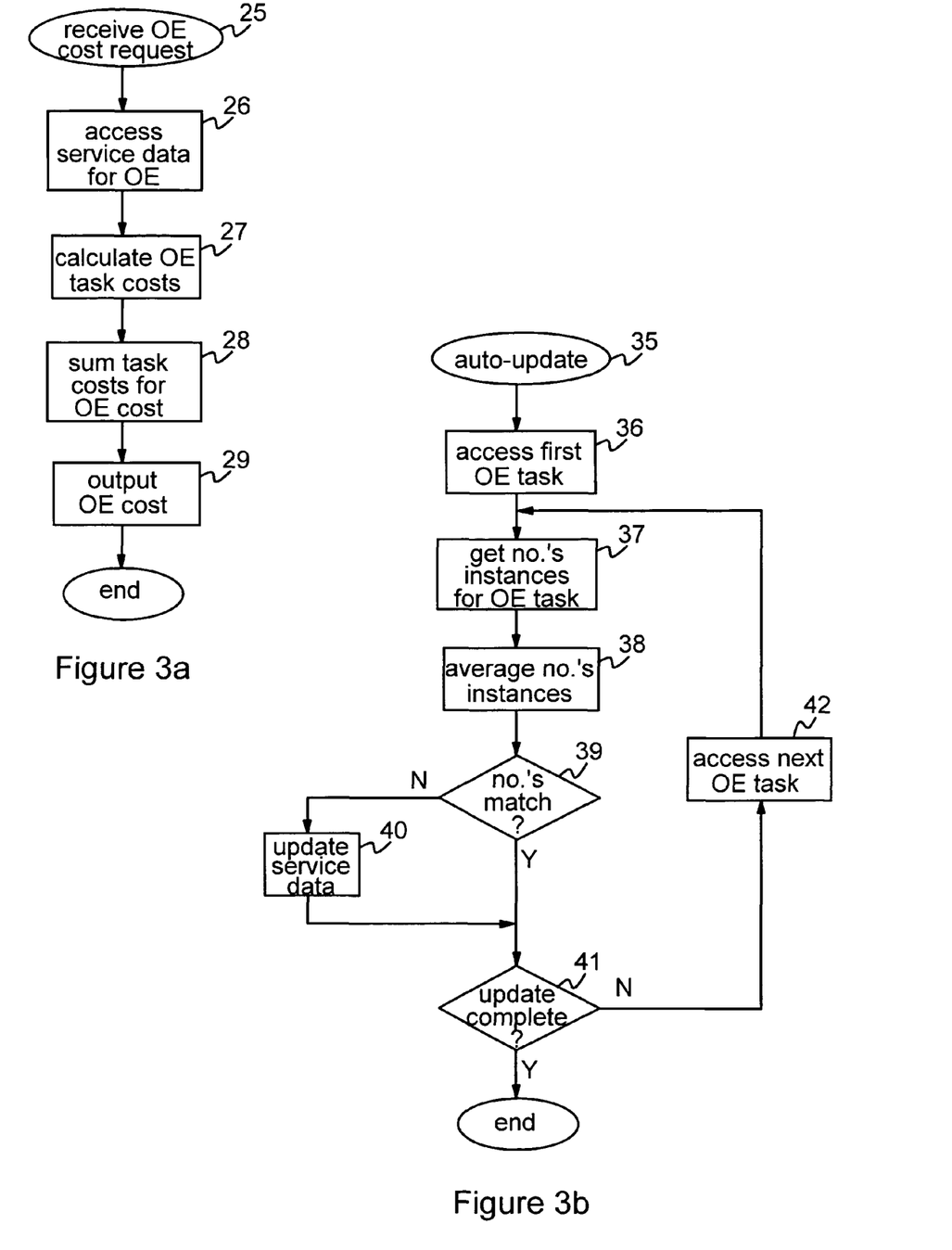
FIGS. 3a and 3b illustrate processes performed by a cost controller in the embodiment of FIG. 1.

The flow chart of FIG. 3*a* illustrates operation of the cost controller 3 on receipt of an OE cost request from proposal formulator 2. Receipt of the request is indicated at step 25, and in step 26 the cost controller 3 accesses service database 5 to retrieve the service data for the appropriate OE. Next, in step 27 the cost controller 3 calculates a task cost for each of the service tasks defined in the OE service data. This is done using the cost data in databases 6 and 7. In particular, task labour times are retrieved from task parameter database 7 where appropriate, and used in conjunction with hourly rates (per skill level where appropriate) retrieved from cost parameter database 6 to calculate the task cost for a single instance of the task. Fixed task costs (such as fixed service charges, item costs etc.) for particular tasks can be obtained directly from the cost parameter database 6. In step 28, the total OE cost is obtained by summing the individual task costs. In particular, where a number of instances is specified in the service data for a given task, the single-instance task cost is multiplied by the appropriate number, and the resulting costs for all itemised tasks are then summed. The OE cost is then output to proposal formulator 2 in step 29 and the process is complete.

Figure 2:
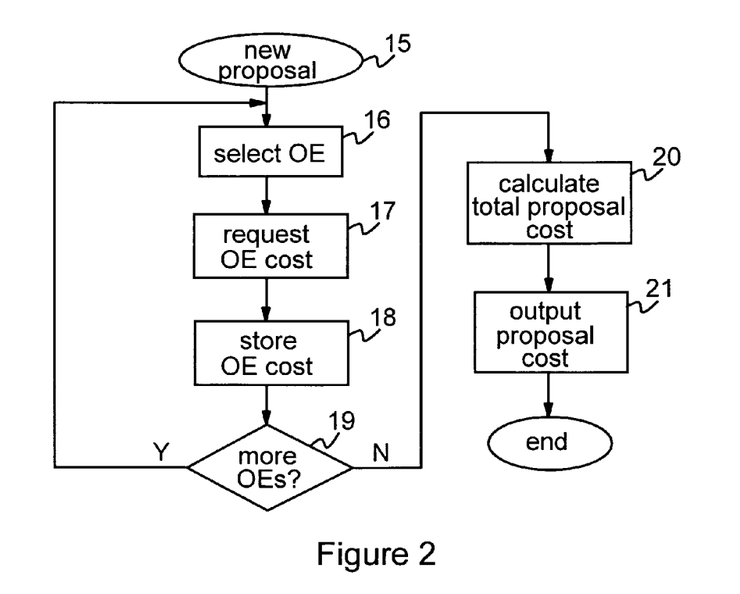
FIG. 2 illustrates operation of a proposal formulator in the embodiment of FIG. 1.

The processes of FIGS. 2 and 3*a* thus allow a total cost to be determined for each new service proposal generated at workstation 9 based on the service data stored for the selected set of proposal elements. However, to ensure that proposal costs are based on accurate, up-to-date service data, cost controller 3 is adapted to automatically update the service data during operation. In this embodiment the service data is updated periodically, the update intervals being pre-set in the system controller as desired, for example at once a week, once a month, etc., as deemed appropriate for a given business. The automatic update process is represented by the flow chart of FIG. 3*b*. When the update process is triggered as indicated by step 35 in FIG. 3*b*, cost controller 3 accesses service database 5 in step 36 to retrieve the service data corresponding to the first task of the first OE for which a number of instances is specified as discussed above. Then, in step 37 the cost controller accesses maintenance database 8 to determine the actual number of times that OE task has been performed in relevant existing services. In particular, in this embodiment it is assumed that OEs are defined for a specific time period such as 12 months (as in "managing a type-Y router for 12 months, 24 hours a day"). Thus, the cost controller 3 can check firstly for service records which have been running for at least the specified time period, and can then count the number of times the relevant task has actually been performed over the appropriate period. (For example, for a "12-month OE" as above, the last full year of maintenance entries may be checked, or the relevant entries for more than one year may be checked and averaged to obtain a number of instances of the service task per year of service). Where a given service record corresponds to a service with multiple instances of the same OE (e.g., where multiple type-Y routers are to be managed so that the service contains multiple instances of the "managing a type-Y router . . . " OE, these can be distinguished in the maintenance data as #1, #2, etc., whereby the cost controller can count the number of task instances for each OE separately, averaging these to obtain a number of task instances for a single OE. In any case, by analysing the maintenance data the cost controller 3 will generally obtain a current number of instances corresponding to the OE task in question for each of a number of services in the maintenance log. These numbers can then be averaged in step 38 of FIG. 3*b* to obtain a current value for the number of instances of that OE task for a single service. In step 39 the cost controller 3 then checks whether the number obtained from the maintenance data matches that currently indicated in the service data retrieved at step 36. If so, ("Yes" at step 39) operation proceeds to step 41. If not, ("No" at step 39), the service data is updated at step 40 with the current number of instances for the service task, and operation proceeds to step 41. Here, the cost controller 3 checks whether the update process is complete, i.e., all relevant service data tasks have been checked against the maintenance data. If not ("No" at step 41), the service data for the next OE service task having a specified number of instances is accessed in step 42, and operation reverts to step 37 for this task. Once all the service data has been checked and updated as appropriate ("Yes" at step 41), the automatic update process is complete.

Figure 4:
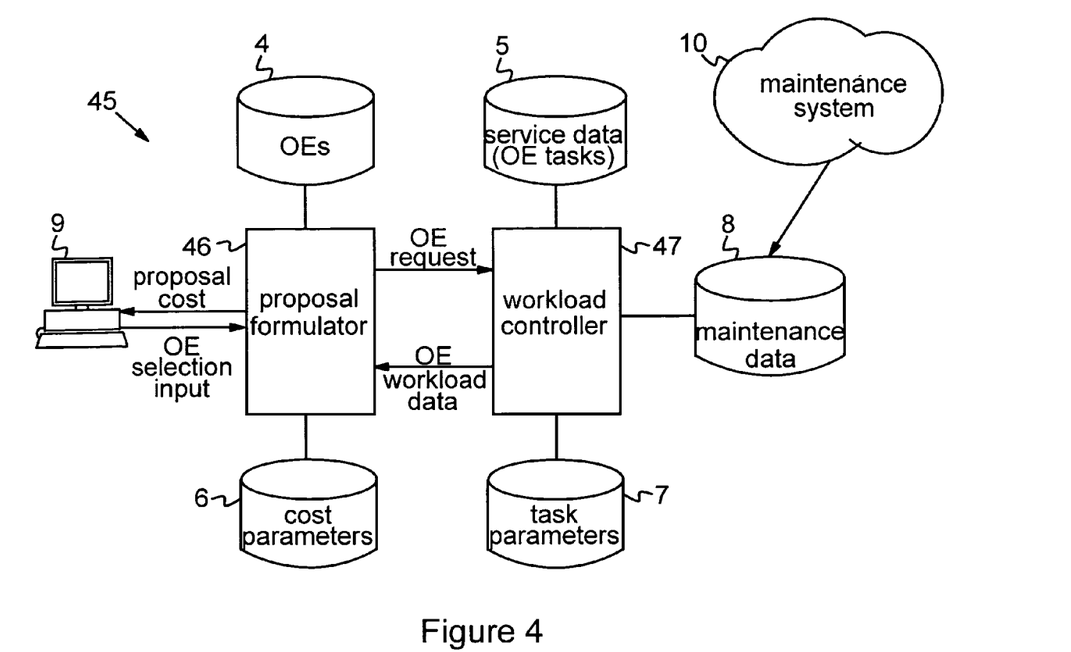
FIG. 4 is a schematic block diagram of a second proposal costing system embodying the invention.
Figure 5:
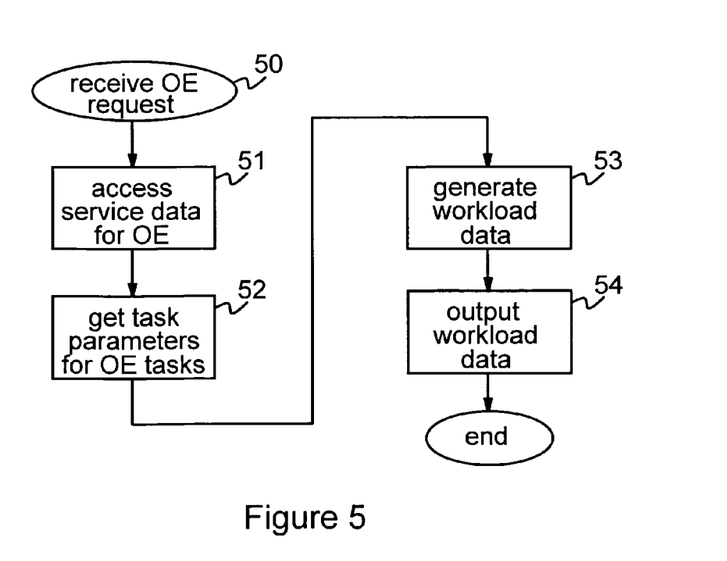
FIG. 5 illustrates operation of a cost controller in the embodiment of FIG. 4.

A second proposal costing system 45 embodying the invention is illustrated in FIG. 4. The system 45 of this embodiment corresponds generally to that of FIG. 1, with like components being labelled with like reference numerals, and only the key differences will be described here. In particular, the system 45 includes a proposal formulator 46 and cost controller, here in the form of workload controller 47, which operate slightly differently to the equivalent components in FIG. 1. Both the OE database 5 and the cost parameter database 6 are associated with the proposal formulator in this embodiment, the remaining databases 5, 7 and 8 being accessible to the workload controller 47. In operation, as each OE is selected by proposal formulator 46 for a new proposal, the proposal formulator 46 issues an OE data request to the workload controller 47. Operation of the workload controller 47 in response to such an OE request is illustrated in the flow chart of FIG. 5. Steps 50 and 51 in this figure correspond to steps 25 and 26 of FIG. 3a. In step 52, however, the workload controller 47 retrieves task labour time(s) for the OE service task(s) in question from task parameter database 7. Next, in step 53, the workload controller 47 generates OE data indicative of the workload associated with the relevant OE. The OE data here indicates the total labour time (per skill category as appropriate) for the OE service task(s) and/or identifies any fixed cost service tasks as appropriate depending on the nature of the service data for the OE. This workload data is then output to proposal formulator 46 in step 54, and the process is complete.

Figure 6:
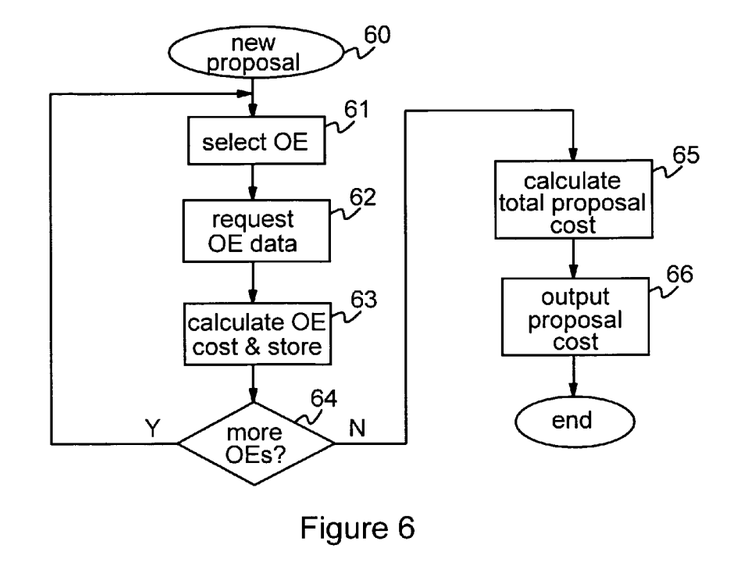
FIG. 6 illustrates operation of a proposal formulator in the embodiment of FIG. 4.

The operation of proposal formulator 46 in this embodiment is indicated in FIG. 6. Steps 60 and 61 in FIG. 6 correspond to steps 15 and 16 of FIG. 2, and in step 62 the proposal formulator 46 transmits an OE request for the selected OE to workload controller 47. On receipt of the OE workload data described above from workload controller 47, the proposal formulator 46 accesses cost database 6 in step 63. In this step, proposal formulator 46 retrieves the cost parameters corresponding to the workload data supplied by the workload controller 47, i.e., the hourly rate(s) for labour time (for the appropriate skill level(s)) and/or the cost for any fixed-cost task identified in the workload data. The total cost for the OE is then calculated from the retrieved cost parameters and the workload data, and the OE cost is stored by the proposal formulator. The subsequent steps 64 to 66 of FIG. 6 are identical to steps 19 to 21 of FIG. 2, whereby a total proposal cost is ultimately supplied to workstation 9.

The workload controller 47 in FIG. 4 performs an automatic update process exactly as described with reference to FIG. 3b. By means of this update process, both embodiments enable continual optimisation of the service data according to real-life data, allowing accurate, up-to-date proposal costings to be generated without reliance on operator estimates. The division of tasks involved in the proposal costing process between the proposal formulator and the cost controller is simply slightly different in the two embodiments.

While two exemplary embodiments have been described above, various alternative embodiments can be envisaged. For example, the cost data used by the system could define the total cost for each OE service task, or type of task. However, the use of separate cost parameters as described above simplifies the process of updating the cost data when basic costs such as hourly rates are changed.

The allocation of tasks involved in the calculation of proposal costs between the proposal formulator and the cost controller may also vary in different embodiments. For example, the cost controller could simply supply the service data for a selected OE to the proposal formulator on request, the proposal formulator then accessing the cost data to calculate task and OE costs as well as total proposal costs. Alternatively, for example, the cost controller could await the OE requests for the entire set of OEs selected for a new proposal, before returning proposal data comprising the OE data for individual OEs, whether specified individually or in processed form, to the proposal formulator. For example, the cost controller may sum the proposal element data (whether expressed in terms of costs or labour/workload) for individual OEs and return the resulting processed data as the proposal data. Such processed proposal data nonetheless comprises the individual proposal element data for each selected OE in that the individual proposal element data for all OEs contributes to the overall summation.

As another example, where the labour time to perform tasks is recorded in maintenance database entries, the task labour times specified in the task parameter data could be checked, and updated where necessary, as part of the automatic update process. In such embodiments, the task parameter data can be deemed part of the service data. (Indeed, the two sets of data could be combined if desired, the service data indicating a specific labour time for each service task).

Figure 7:
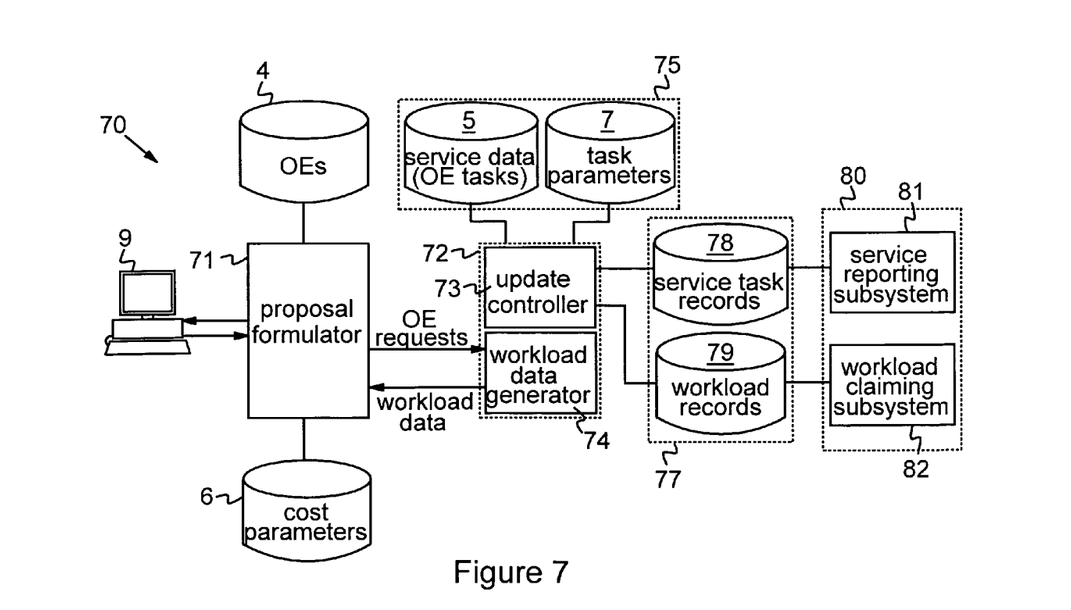
FIG. 7 is a schematic block diagram of a third proposal costing system embodying the invention.

FIG. 7 illustrates an exemplary embodiment of a proposal costing system 70 incorporating some of the modifications just described. The system 70 of this embodiment corresponds broadly to the system of FIG. 4, with like components similarly labelled, and only the key differences will be described here. In particular, the system 70 includes a proposal formulator 71 and a cost controller, indicated generally at 72, which operate slightly differently to the equivalent components of FIG. 4. The cost controller 72 here comprises an update controller 73 and a workload generator 74, the functions of which are described further below. In general, update controller 73 and workload generator 74 may be implemented by one or more data processing devices such as servers, workstations, etc. The service database in this embodiment is indicated generally at 75 and encompasses both database 5 (in which the OE service tasks corresponding to changes/problems of different complexity/severity categories are defined as described above with an associated number of instances for each task) and also the task parameter database 7 which defines the expected labour time for OE tasks. Specifically, in this embodiment the task parameter database defines the expected labour time, skill level and number of staff required for tasks of different complexity/severity categories. For example, the task parameters for a task representing a change of complexity category "high" might be defined as follows:

```
<task type="change" complexity="high">
    <staff>
        <number>1</number>
        <skill>certified</skill>
        <time>10</time>
    </staff>
</task>
```

Similar task parameters can be provided for changes of complexity categories "low" and "medium," and for problems of severity categories "low," "medium," and "high".

The maintenance database, indicated generally at 77 in this embodiment, also consists of two component databases 78 and 79. The maintenance system is indicated generally at 80 here and comprises two subsystems 81 and 82. Database 78 contains service task records in which entries relating to problems/changes dealt with in operation of real services are recorded as described earlier. These entries in database 78 are made via service reporting subsystem 81 of the maintenance system 80 when tasks are performed in operation of customer services. Database 79 contains workload records which are made via workload claiming subsystem 82 of the maintenance system 80. This subsystem enables entries indicating the labour time, skill level, and staff numbers required in performance of tasks for real services to be recorded in database 79. Thus, each time a change/problem task corresponding to a particular complexity/severity category is performed in operation of a customer service, a report can be input via subsystem 82 and a corresponding entry recorded in database 79.

In operation of this embodiment, the automatic updating of the service data is performed periodically by update controller 73. During this process, database 78 is accessed to determine the numbers of times individual service tasks have been performed in operation of real services, and corresponding numbers of instances indicated for services tasks defined in database 5 can be updated accordingly where required. This process corresponds generally to the update process in the embodiments described earlier. Here, however, the task parameters in database 7 are also checked against workload records in database 79, and updated for conformity with these records where necessary. For example, for entries in database 79 corresponding to a given change/problem complexity/severity category, the recorded time, number of staff, and skill level if desired, can be averaged, and the results compared with the current specifications of these parameters in database 7 for that task. Where there is a discrepancy, the task parameters in database 7 can be updated accordingly to conform to the real-life data.

The process of costing a new service proposal in system 70 is similar to that performed by the FIG. 4 embodiment. In this case, however, OE data requests issued by proposal formulator 71 for selected OEs are received by workload data generator 74. The workload data generator 74 accesses databases 5 and 7 as described earlier to derive workload data indicating the total labour time (per skill level) for each OE, and the resulting labour times are accumulated for all OEs selected by the proposal formulator 71. When all OEs have been selected, the resulting workload data (accumulated labour times per skill level, plus indications of any fixed cost tasks if appropriate) is returned by the workload data generator 74 to proposal formulator 71. The proposal formulator 71 then uses the cost parameters in database 6 to determine the total proposal cost.

As a further example of modifications to the above embodiments, the service data need not expressly specify a number of instances for a particular service task. In some embodiments, the service data could specify a total expected labour time for all instances of a given task, this then being updated as required based on task labour times recorded in the maintenance log. While various modifications of this type can be envisaged, the above embodiments provide elegantly simple yet effective systems with particularly efficient data structures.

Further, while simple systems are employed in the above embodiments for analysing the maintenance data, various other, more complex analysis processes may be performed if desired. Indeed, more complex analyses of the maintenance data may allow the particular service tasks itemised in OE service data to be modified in some embodiments, where tasks specified for an OE are found to differ in provision of that OE in actual services.

Also, the automatic update process need not necessarily be performed periodically. For example, embodiments can be envisaged in which the update process is triggered by an event other than a timer event, e.g., an externally generated prompt such as a signal from the maintenance system indicating significant changes to the maintenance log. Alternatively, for example, the cost controller could itself monitor new entries to the maintenance log, and initiate the update process when significant changes have been made.

In addition, while the above embodiments have been described in the context of data processing system outsourcing businesses, the invention can be applied to the costing of proposals for various types of services where maintenance data indicating the tasks performed in operation of real services is maintained as part of the business.

Various other changes and modifications can be made to the embodiments described above without departing from the scope of the invention.

The invention claimed is:

1. A computer-implemented system for costing proposals for service by a service provider, each proposal comprising a set of proposal elements (OEs) selected from a predetermined group of proposal elements, the system comprising:
   at least one data processing system; and
   a costing proposal system executable by the at least one data processing system, the costing proposal system comprising:
      a proposal formulator for selecting a set of proposal elements (OEs) for a new service proposal from the predetermined group of proposal elements stored in a first database, in response to user input; and
      a cost controller for performing the following steps:
         maintaining, in a second database, for each proposal element (OE), service data indicative of service tasks associated with that proposal element, and
         automatically updating the service data for each OE during operation in dependence on maintenance data stored in a third database, the maintenance data detailing actual service tasks performed by the service provider in operation of real services, wherein the automatic updating occurs at a periodic preset interval,
         wherein the service data include an expected number of instances for service tasks based on a number of actual instances of those service tasks in operation of real services as indicated by the maintenance data; and an expected labor time for service tasks based on actual labor times indicated by the maintenance data; and
      wherein the costing proposal system determines a total cost for the new service proposal in dependence on the service data for the selected proposal elements (OEs) and cost data indicating a cost of service tasks indicated by the service data;
      wherein, for each of at least some of the service tasks, the service data indicates a change in complexity for that service task, an expected number of instances for that service task, based on the change in complexity, and for each of at least some of the proposal elements, the service data indicates an expected labor time for at least one service task associated with that proposal element.

2. A computer-implemented system as claimed in claim 1 wherein:
   for each proposal element (OE) selected by the proposal formulator, the proposal formulator requests a proposal element cost from the cost controller;
   in response to a cost request for a proposal element (OE), the cost controller determines the proposal element cost in dependence on the cost data and the service data for that proposal element, and supplies the proposal element cost to the proposal formulator; and
   the proposal formulator determines a total cost for a new service proposal in dependence on the proposal element costs for the selected proposal elements (OEs).

3. A computer-implemented system as claimed in claim 1 wherein:
- for each proposal element (OE) selected by the proposal formulator, the proposal formulator requests proposal element data from the cost controller;
- in response to a data request for a proposal element, the cost controller supplies proposal element data, dependent on the service data for that proposal element, to the proposal formulator; and
- the proposal formulator determines the total cost for a new service proposal in dependence on a cost data and the proposal element data for the selected proposal elements (OEs).

4. A computer-implemented system as claimed in claim 1 including a service database for storing the service data.

5. A computer-implemented system as claimed in claim 1 including a cost database for storing the cost data.

6. A computer implemented method for costing proposals for service by a service provider, the method comprising:
- using a computer input device, selecting a set of proposal elements (OEs) for a new service proposal from a predetermined group of proposal elements stored in a first database in response to user input;
- maintaining in a second database, for each proposal element (OE), service data indicative of service tasks associated with that proposal element;
- determining a total cost by a data processing system, for the new service proposal in dependence on the service data for the selected proposal elements and cost data indicating the cost of service tasks indicated by the service data; and
- automatically updating by the data processing system, during operation, the service data for proposal elements (OEs) in the group in dependence on maintenance data stored in a third database, and indicative of service tasks performed by the service provider in operation of real services, wherein the automatic updating occurs at one of a periodic preset interval;
- wherein, for each of at least some of the service tasks, the service data indicates a change in complexity for that service task, an expected number of instances for that service task, based on the change in complexity, and for each of at least some of the proposal elements, the service data indicates an expected labor time for at least one service task associated with that proposal element;
- wherein, the automatic updating automatically updates: the expected numbers of instances for service tasks based on a number of actual instances of those service tasks in operation of real services as indicated by the service provider's maintenance data; and the expected labor times for service tasks based on actual labor times indicated by the maintenance data for the service provider's performance of those service tasks in operation of real services; and
- providing the total cost for a new service proposal for presentation to a user.

7. A computer-readable non-transitory medium encoded with computer instructions, which when executed, enables a computer system to generate proposals for service by a service provider, the computer instructions comprising:
- selecting respective sets of proposal elements (OEs) for a new service proposal from a predetermined group of proposal elements stored in a first database;
- maintaining in a second database, for each proposal element (OE), service data indicative of service tasks associated with that proposal element;
- automatically updating, during operation, the service data for proposal elements (OEs) in the group in dependence on maintenance data stored in a third database, and indicative of service tasks performed by the service provider in operation of real services, wherein the automatic updating occurs at a periodic preset interval; and
- in response to a proposal element request for a proposal element (OE), supplying proposal element data, dependent on the service data for that proposal element, to the computer system for use in costing a service proposal for which that proposal element is selected;
- wherein, for each of at least some of the service tasks, the service data indicates a change in complexity for that service task, an expected number of instances for that service task, based on the change in complexity, and for each of at least some of the proposal elements, the service data indicates an expected labor time for at least one service task associated with that proposal element; and
- wherein, the automatic updating automatically updates: the expected numbers of instances for service tasks based on a number of actual instances of those service tasks in operation of real services as indicated by the service provider's maintenance data; and the expected labor times for service tasks based on actual labor times indicated by the maintenance data for the service provider's performance of those service tasks in operation of real services.

* * * * *